(12) United States Patent
Marbach

(10) Patent No.: US 6,674,526 B1
(45) Date of Patent: Jan. 6, 2004

(54) METHODS AND APPARATUS FOR IMPROVING THE LONG-TERM STABILITY OF SPECTROSCOPIC QUANTITATIVE ANALYSES

(76) Inventor: Ralf Marbach, Kangasrinne 14, 90240 Oulu (FI)

( * ) Notice: Subject to any disclaimer, the term of this patent is extended or adjusted under 35 U.S.C. 154(b) by 71 days.

(21) Appl. No.: 09/919,820

(22) Filed: Aug. 2, 2001

Related U.S. Application Data

(60) Provisional application No. 60/222,671, filed on Aug. 3, 2000.

(51) Int. Cl.[7] .................................................. G01J 3/00
(52) U.S. Cl. ....................................... 356/300; 356/326
(58) Field of Search ................................ 356/300, 326

(56) References Cited

U.S. PATENT DOCUMENTS 5,422,719 A * 6/1995 Goldstein .................... 356/334
5,784,158 A * 7/1998 Stanco et al. ................ 356/326
5,822,071 A * 10/1998 Dosmann et al. ............ 356/326
6,404,970 B1 * 6/2002 Gransden et al. ............ 385/140

* cited by examiner

Primary Examiner—F. L. Evans
Assistant Examiner—Kara Geisel

(57) ABSTRACT

The long-term stability of the analytic accuracy of spectroscopic measurements is often limited by wavelength axis instabilities of the hardware. A dedicated optical element called the inverse sample element (4) is inserted into the path of the measurement light. The optical response of the inverse sample element (4) is determined from the spectral response of the average sample (3) in such a way that wavelength axis instabilities of the instrument hardware cause opposite and nearly cancelled amplitude effects in the resulting absorbance spectrum. The inverse sample element (4) can be movable or permanently mounted inside the instrument and is preferably made from a thin-film structure.

19 Claims, 1 Drawing Sheet

METHODS AND APPARATUS FOR IMPROVING THE LONG-TERM STABILITY OF SPECTROSCOPIC QUANTITATIVE ANALYSES

CROSS-REFERENCE TO RELATED APPLICATIONS

This application is entitled to the benefit of Provisional Patent Application Ser. No. 60/222,671 filed Aug. 3, 2000.

FEDERALLY SPONSORED RESEARCH

Not applicable

SEQUENCE LISTING OR PROGRAM

Not applicable

SEQUENCE LISTING

Not applicable

REFERENCES CITED

1. R Marbach, On Wiener Filtering and the Physics Behind Statistical Modelling, Journal of Biomedical Optics 7(1), pp. 130–147 (January 2002).

FIELD OF THE INVENTION

The invention relates to methods and apparatus for improving the long-term stability of spectroscopic quantitative analyses.

BACKGROUND OF THE INVENTION

Spectroscopic quantitative analysis (SQA) is the spectrally resolved measurement of light interacting with a sample for the purpose of quantifying a property of that sample. A simple example is an infrared (IR) transmission measurement through a cuvette filled with a liquid sample, for the purpose of quantifying a component concentration in that sample.

A multitude of different optical phenomena, e.g., absorbance, scatter, fluorescence, rotation of polarization, etc.; exist and can be used for SQA, and the nature of the sample and its property of interest will usually determine which phenomenon is best to use for a particular measurement application. Many applications work in the visible wavelength range, i.e., 400–700 nm (VIS), but the majority of applications require the measurement of light at wavelengths outside of the VIS, and typical wavelength ranges employed range from the deep ultraviolet ($\lambda$<200 nm) to the long-wave infrared ($\lambda$>20,000 nm). A multitude of different hardware configurations exist for resolving the optical spectrum, e.g., optical filters, interferometers, optical gratings, matched-wavelength LED's, etc.; and selection depends on the particular application, the wavelength band, the required accuracy of the measurement, as well as various marketing factors. This invention applies to all optical phenomena and to all hardware configurations, from the simplest case of a single optically resolved wavelength "band" realized by the shape of the emission spectrum of the selected light source, to the most complicated and expensive configurations resolving thousands of wavelength bands.

Typical application areas for SQA are industrial process control (e.g., chemical process optimization) and industrial quality control (e.g., incoming material checking) and in recent times also medical applications (e.g. blood analysis) and consumer applications (e.g. food freshness control or indoor gas sensing). A common characteristic of all SQA measurements is the fact that the measurement is actually a two-step process. First, an optical spectrum is measured and second, a calibrated algorithm is applied to the measured data to transform the spectrum into the desired value of the property of interest. The second step is typically performed in software and is therefore not subject to long-term drifts or temperature instabilities. The long-term reliability of the whole system is almost always limited by the instability of the instrument hardware.

Long-term drifts and temperature instabilities of the hardware affect both the x- and the y-dimension of the spectra. Without any loss of generality, assume that optical wavelength (x-dimension) is measured in, e.g., nanometers (nm) and that the amplitude of the detected spectral signal (y-dimension) is measured in, e.g., Volts per nanometer [V/nm].

Typical causes of amplitude instability include lamp-aging, accumulation of dirt on the optics, electronic drifts in the amplifiers, and responsivity fluctuations of the photodetector. When propagated through the computer algorithm, amplitude instabilities equate to measurement errors in the property of interest, with the proportionality factor being strongly dependent on the spectral shape of the instability effect.

A typical cause of wavelength axis instability is thermally induced strain in the optomechanics of a spectrograph. Wavelength axis instabilities transform themselves into equivalent amplitude instabilities first, and then into measurement errors. The fundamental difference between amplitude instabilities and wavelength axis instabilities is that amplitude instabilities are ratioed out by spectroscopic referencing, see the discussion below.

The computer algorithms typically need processed ratios between a sample spectrum and a reference spectrum as input. In the following text of the specification and the claims, these input spectra will generally be referred to as "absorbance spectra" regardless of the underlying optical measurement principle, e.g., transmission or diffuse reflection.

In a general sense it can be said that amplitude instabilities are typically the dominant problem in simple SQA applications, i.e., in well-posed measurements with relatively large spectral signal-to-noise ratios (SNR). "Well-posed" here means that the root-mean-square (RMS) variation of the spectral fingerprint of the signal is comparable to, or even larger than, the RMS variation of even the largest eigenfactors of the spectral noise (where "largest eigenfactor" is short for "eigenfactor with the largest eigenvalue") [1]. The technique of spectroscopic referencing is usually performed to combat amplitude instabilities, e.g., in the case of the transmission cuvette, the spectrum from the sample $S(\lambda)$[V/nm] can be ratioed by a reference spectrum $R(\lambda)$[V/nm] from, e.g., the empty cuvette or no cuvette at all ("empty path"), to form an absorbance spectrum $A(\lambda)=-\log_{10}(S(\lambda)/R(\lambda))$(in units of [AU]). In some applications, e.g., in a diffuse reflection-type measurement, it is not possible to use the empty cell for the reference measurement, and a dedicated reference element must be placed into the path of the measurement light, typically at the same position where the sample is located during the sample measurement. Design, choice of material, and handling of the reference element are all usually optimized in order to maximize the long-term stability of the optical response of the reference.

Referencing is almost universally employed because it is well suited to decrease amplitude instabilities in the larger eigenfactors of the spectral noise, and is often sufficient to achieve satisfactory long-term performance in simple SQA applications.

Many of the more recent SQA applications, however, are precision measurements, i.e., ill-posed measurements where the RMS variation of the spectral fingerprint of the signal is smaller than the RMS variation of many of the larger eigenfactors of the spectral noise. Graphically speaking, the spectral signal can no longer be seen with the naked eye when the spectra are plotted. In these applications, the required spectral SNR does not reside in the spectral space spanned by the larger eigenfactors, but has to come from the smaller eigenfactors [1]. Wavelength axis instabilities are a significant contributor to the noise in the smaller eigenfactors, and are especially detrimental to the measurement because they can not be referenced out by using the spectroscopic referencing techniques of the prior art.

SUMMARY OF THE INVENTION

This invention provides methods and apparatus for improving the long-term stability of spectroscopic quantitative analyses, by eliminating or significantly reducing the detrimental effects of wavelength axis instabilities. The effects of wavelength axis instabilities are diminished by inserting an optical element into the path of the measurement light, which is called the inverse sample element (ISE) and which has spectral characteristics designed such that wavelength axis instabilities of the instrument hardware cause opposite and nearly cancelled amplitude effects from the sample and the ISE in the resulting absorbance spectrum.

DETAILED DESCRIPTION OF THE INVENTION

Figure 1:
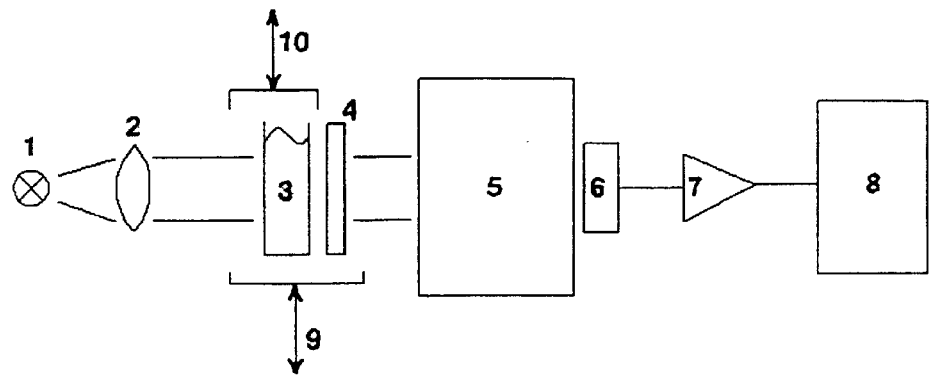
FIG. 1 shows a schematic of a first embodiment of the invention.

It will be helpful to discuss different methods of this invention first, and then the apparatus.

A first method will be discussed in conjunction with FIG. 1, where a typical setup for the measurement of optical transmission is shown. Light source 1 emits light of appropriate wavelengths through lens 2 onto sample 3, which absorbs part of the light. The light then proceeds through ISE 4 into a spectrometer unit 5 consisting of, e.g., an optical grating and a PbS photodetector array. The spectrum is then read out of photodetector 6, amplified and A/D converted by electronics 7, and fed into computer 8 for further analysis. The simple transmission setup shown in FIG. 1 will be used as an example throughout the following discussion, however, the invention applies to other setups as well, e.g., diffuse reflection, attenuated total-reflection, emission, etc. People skilled in the art can readily apply the transmission example to their particular application. Now, in the transmission case, the sample spectrum detected by the photodetector can be written as $$S(\lambda) = L(\lambda) \cdot T_S(\lambda) \cdot T_{ISE}(\lambda) \cdot T_{Opt}(\lambda) \cdot D(\lambda) [V/nm] \quad (Eq.1)$$

where $L(\lambda)$ is the emission spectrum of light source 1; $D(\lambda)$ is the responsivity spectrum of photodetector 6; and $T_S(\lambda)$, $T_{ISE}(\lambda)$, and $T_{Opt}(\lambda)$ are the transmission spectra of the sample, the ISE, and all other optical elements, respectively.

The spectral response of the ISE is designed to be as close as possible to $$T_{ISE}(\lambda) \propto \frac{1}{\frac{L(\lambda)}{L_0} \cdot \overline{T}_S(\lambda) \cdot T_{Opt}(\lambda) \cdot \frac{D(\lambda)}{D_0}} \quad (Eq. 2)$$

where $L_0 = \max(L(\lambda))$ and $D_0 = \max(D(\lambda))$ are normalizing constants with max(...) defined as a function that picks the maximum value within the relevant $\lambda$-range of the measurement; $\overline{T}_S(\lambda)$ is the transmission spectrum of the average sample; and the symbol "$\propto$" means "proportional to." The relevant $\lambda$-range consists of those wavelength bands that are actually used by the calibration algorithm of the particular SQA application, which may be only a subset of the total wavelength range measured by the instrument hardware, see also the discussion below. In the following, the transmission spectrum of the sample under study is written as $$T_S(\lambda) = \overline{T}_S(\lambda) \cdot (1 + \Delta T_S(\lambda)) \quad (Eq.3)$$

where $\Delta T_S(\lambda)$ is the usually small deviation from the average sample, i.e., $|\Delta T_S(\lambda)| \ll 1$.

The sample spectrum detected by photodetector 6 in FIG. 1 is then $$S(\lambda) \propto L_0 \cdot (1 + \Delta T_S(\lambda)) \cdot D_0 [V/nm] \quad (Eq.4)$$

i.e., it is essentially constant of wavelength. As a result of the "$\lambda$-flatness," wavelength axis instabilities produce zero amplitude effects and are therefore eliminated as sources of measurement error. Because the wavelength axis instabilities of the hardware are typically small, viz., on the order of 0.1 nm or smaller, relative to the width of the characteristic spectral bands of the solid or liquid samples used in most applications, cancellation of wavelength axis instability effects by the use of an ISE works extremely well in practice.

Spectroscopic referencing is performed by removing both sample 3 and ISE 4 out of the path of the measurement light, as indicated by arrow 9. The reference can then be measured either by measuring the empty path, which may be preferred in the transmission setup shown in FIG. 1, or by inserting a reference element (not shown) into the path of the measurement light. A reference element is not absolutely necessary in a transmission setup, but it is necessary in other setups, e.g., diffuse reflection. This concludes the description of the first method, which is the preferred method of implementing the invention.

A second method is similar to the first method, except that ISE 4 is permanently fixed in the path of the measurement light and is therefore not removed during referencing. Instead, only sample 3 is removed during referencing as indicated by arrow 10. Of course, as a result, now the sample spectrum $S(\lambda) \propto L_0 \cdot (1 + \Delta T_S(\lambda)) \cdot D_0$ is $\lambda$-flat, but the reference spectrum is not $$R(\lambda) = L(\lambda) \cdot T_R(\lambda) \cdot T_{ISE}(\lambda) \cdot T_{Opt}(\lambda) \cdot D(\lambda) \propto \frac{L_0 \cdot T_R(\lambda) \cdot D_0}{\overline{T}_S(\lambda)} [V/nm] \quad (Eq. 5)$$

where $T_R(\lambda)$ is the transmission spectrum of the reference element, which could be the empty path, i.e., just air. Since $T_R(\lambda)$ is virtually always $\lambda$-flat for material availability and long-term stability reasons, the reference spectrum $R(\lambda)$ now is not $\lambda$-flat but has spectral shape approximately equal to the inverse of the sample spectrum, i.e., $R(\lambda) \propto 1/\overline{T}_S(\lambda)$. It would thus appear to somebody skilled in the art that the second method is ineffective, and that the elimination of wavelength axis instability effects in the sample spectrum $S(\lambda)$ can only be achieved by introducing the exact same magnitude of error into the reference spectrum $R(\lambda)$, thus achieving a zero net improvement. This, however, is not correct because the reference spectra $R(\lambda)$ can be filtered in software before computing the absorbance spectra. Filtering can be done without loss of information and with a net positive effect on spectral SNR, because the smaller eigenfactors of the spectral noise of the reference spectra are known α-priori to be just that noise.

In practice, the filtering algorithm can be implemented, e.g., by measuring a large number of representative reference spectra, viz., at least five times as many reference spectra as resolved wavelength bands; then arranging the representative reference spectra into a matrix X where each row of the matrix X is one reference spectrum or its absorbance equivalent—$\log_{10}(R(\lambda)/[V/nm])$; then mean-centering the matrix X; then computing the singular value decomposition $X = U\ S\ V^T$; and then, lastly, filtering each newly-measured reference spectrum by projecting it into the spectral subspace spanned by only the first one or first few eigenvectors $v_1, v_2, \ldots$ with the largest singular values $s_1, s_2, \ldots$. These and other noise filtering schemes based on eigenvector analysis of the measured spectral data are well-known to those skilled in the art and need not be elaborated here, given that large amounts of literature arc available. under the relevant acronyms of PCA, PCR, PLS, etc. A multitude of other effective filtering techniques are also available, e.g., the various low-pass filter algorithms routinely applied by electrical engineers in time-signal processing, some of which are known e.g. as Golay-Savitzki filters in the spectroscopy community. In s in contrast to the other methods described in this invention, which are "stand-alone" and do not require any supporting software algorithms, the second method does require supporting software, viz., a noise-filtering of the reference spectra, and in principle any algorithm that smoothes the reference spectra from their noise can be used.

A third method is different from the other two in that the spectral response of the ISE is designed as close as possible to $$T_{ISE}(\lambda) \propto \overline{T}_S(\lambda) \tag{Eq.6}$$

and in that ISE 4 is not inserted into the path of the measurement light during the sample measurement, but instead, during the reference measurement. In effect, ISE 4 is used as the reference element. Thus, the sample and reference spectra measured are $$S(\lambda) = L(\lambda) \cdot T_S(\lambda) \cdot T_{Opt}(\lambda) \cdot D(\lambda) \tag{Eq.7}$$

and $$R(\lambda) = L(\lambda) \cdot T'_{ISE}(\lambda) \cdot T_{Opt}(\lambda) \cdot D(\lambda) \tag{Eq.8}$$

respectively. Now neither the sample nor the reference spectrum is λ-flat, but instead, the two have almost identical spectral shapes. As a result, wavelength axis instabilities will cause virtually identical amplitude effects in the two spectra, which will then, in turn, cancel out in the absorbance spectrum.

It should be mentioned here that the third method has actually been realized by several researchers in some pro-totyping situations in the past, however, for different reasons and unknowingly of the potential benefits for actual field use. E.g., when studying biological fluids like plasma or serum in an infrared transmission cuvette, some researchers filled the cuvette with water for the reference measurement, in order to (1) clean the cuvette out from some harsher cleaning agents used between samples and to (2) balance the dynamic range requirements between the sample and the reference measurement in order to avoid frequent adjustments to the electronics. Since the absorption spectra of water and blood plasma are similar in the infrared, Equation 6 was approximately fulfilled. However, the use of a water-filled cuvette as a reference has always been considered a disadvantage by these researchers, because of (1) the apparent decrease in spectral SNR when (wrongly) judged by the effect on measurement precision, see discussion below, and (2) because of the extra work, time, and handling risk associated with having to fill the cuvette twice. Commercial instruments built for routine applications therefore use build-in reference elements made from a λ-flat material, e.g., the empty cell (air) in a transmission setup or SPEC-TRALON™ from Labsphere (North Hutton, N.H.) in a diffuse reflection setup. Moreover, these reference elements are often automatically moved in and out of the path of the measurement light by electro-mechanical means, in order to simplify and speed up the measurement process.

For commercialization and field use, ISE's have to be built that do not create extra sampling work to the user, or increase the risk of sampling errors, or are incompatible with industry regulations, or noticeably increase the overall time required for the measurement, or introduce significant long-term instabilities of their own. In short, their overall effect on the validated spectral SNR must be positive. Also, cost and other marketing requirements need to be considered. Fortunately, ISE's fulfilling these requirements can be realized using a multitude of different components manufactured by a multitude of different techniques. E.g., color filter glasses can be used, in any combination, to produce a target spectral shape of an ISE. More than 200 different types of filter glasses are available from the three major manufacturers alone, viz., Schott Optical Glass Inc. (Duryea, Pa.), Hoya Corp. (Tokyo, Japan), and Corning Glass Works (Coming, N.Y.). A number of application-specific solutions also exist, based either on the specific material of the sample, or on a specific characteristic of the sample geometry. In a general sense, however, the preferred realization of ISE's is based on thin-film coatings, i.e., uni- or multilayer structures of dielectric and/or metallic coatings with thicknesses on the order of, and smaller than, the wavelengths of the light. Thin-film coatings are sufficiently long-term stable, inexpensive, can be designed to practically any desired spectral shape, and can be attached to most optical surfaces in a system. E.g., in the system depicted in FIG. 1, a preferred solution would be to apply the ISE optical coating directly to the side of the cuvette containing sample 3.

Figure 2:
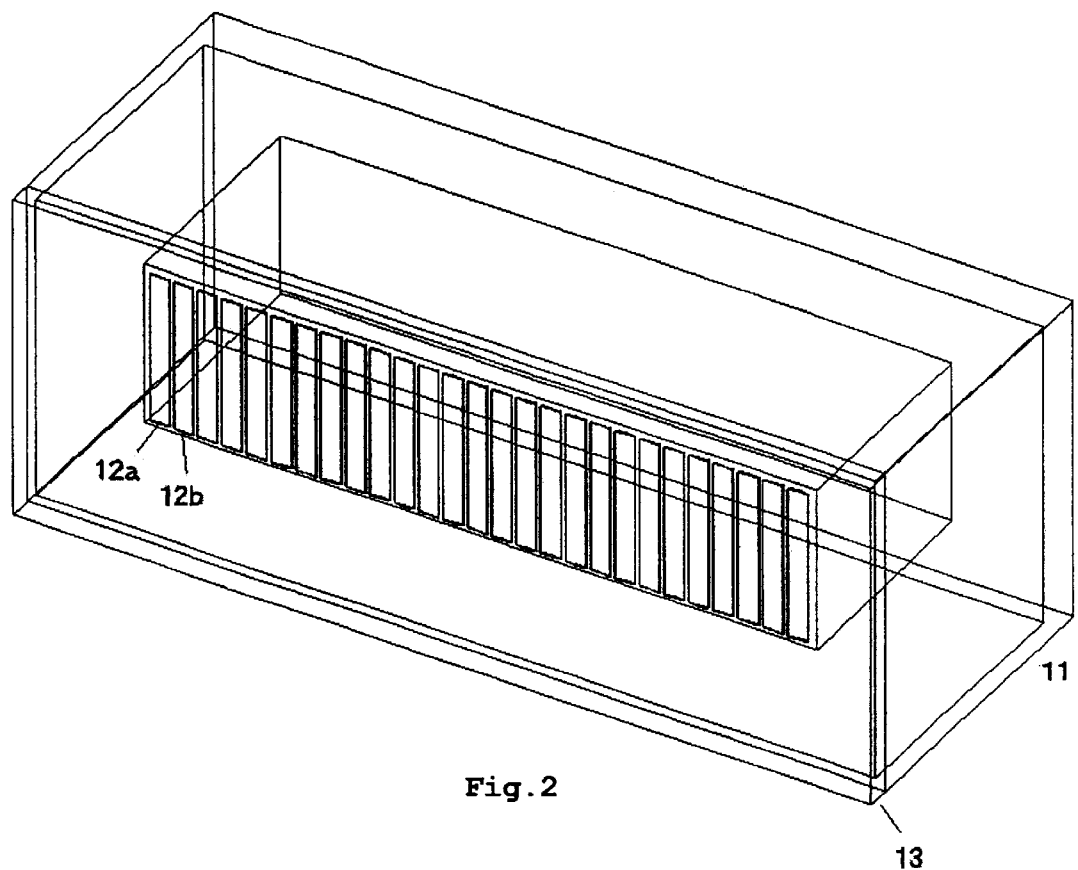
FIG. 2 shows a second embodiment of the invention.

In spectrograph-type systems, in which the light is spatially dispersed and a detector is placed such that optical wavelength is uniquely related to spatial position in the detector focal plane, an especially simple, cheap, and long-term stable way of realizing an ISE exists, cmp. FIG. 2. Here, a photodetector array with pixels $12a, 12b, \ldots$ is packaged in a housing 11 which, in turn, is sealed with an optical window 13. The measurement light is dispersed such that different wavelengths fall on different pixels $12a$, $12b \ldots$ and therefore traverse through window 13 at different locations. The ISE is realized by thin-film deposition of a single metallic layer of varying thickness onto at least one of the optically active surfaces of window 13, and preferably the one closest to pixels $12a, 12b \ldots$ because this side (1) is hermetically sealed and protected and (2) is close to the focal plane of the system, i.e., pixels $12a, 12b \ldots$, meaning that the optical resolution at the ISE can be almost as fine as the optical resolution of the overall system. Film thickness, and thus optical transmittivity, is varied along the spatial direction that corresponds to the wavelength axis. Accurate control of film thickness is relatively simple by controlling the deposition time period spent at different locations on window 13.

In conclusion, wavelength axis instability effects are not referenced out by using the spectroscopic referencing techniques of the prior art. Instead, the methods and apparatus of this invention must be used to cancel out wavelength axis instability effects. At first glance, people skilled in the art may say that the presented methods are counterproductive, in that they take away light from the detector which, in turn, will increase the effect of instrumental amplitude noise in the absorbance spectra. This argument is absolutely correct. However, the accuracy of many SQA applications is not limited by instrumental noise, as is evidenced by the fact that the precision (repeatability) is often much better than the overall accuracy. Instead, the long-term accuracy is very often limited by slow, 1/f-type noises, and wavelength axis instabilities form an important contribution here. Thus, for many SQA application cases, the net result of the ISE on the long-term spectral SNR is positive.

With the recent improvement in understanding of the multivariate calibration process and how to measure the spectral SNR that drives measurement accuracy [1], many application-specific improvements have become possible and the cancellation of wavelength axis instabilities by use of ISE's is a major one. In fact, maximization of spectral SNR should be the guiding principle in all design work related to SQA, including the design of ISE's. E.g., it was mentioned above that the spectral characteristics of the ISE have to be designed to the specific spectral shape only in the "relevant" $\lambda$-range. The concept of spectral SNR can be used to fine-tune the definition of "relevant." E.g., say a transmission measurement is performed on aqueous samples in a 1-mm cuvette in the near-infrared orange, including the strong water absorbance band at $\lambda=1.9$ $\mu$m. Because of the low detected light level, the absorbance noise around 1.9 $\mu$m will be very high. As a result, an algorithm calibrated for a wavelength range containing the 1.9 $\mu$m region may draw zero percent of its spectral SNR from that region. In other words, the algorithm will have automatically de-sensitized itself against the noise in that region, by just not utilizing the data from there. Obviously, in this case the 1.9 $\mu$m region is also irrelevant to the measurement, although it is not formally excluded from the calibration algorithm. Continuing this argument to the ideal state, a skilled systems engineer could actually design the spectral shape of an ISE to exactly maximize the spectral SNR of a particular application, by intelligently trading off wavelength axis instability effects versus other instrument noise effects. The exact formula for the optimum ISE shape, however, is complicated and depends on the covariance matrix of the spectral noise in the specific application. The spectral shapes described in Equations (2) and (6), on the other hand, are simple and close to the theoretically optimum shape and provide the bulk of the possible SNR-improvement. When applied by a person skilled in the art, the SNR-improvement achieved will be practically identical to the theoretical maximum.

The disclosed methods and apparatus are examples of how the invention can be reduced to practice. Variations and modifications falling within the scope of the appended claims will be apparent to those skilled in the art. E.g., the invention can be applied to measurement setups other than transmission, e.g, diffuse reflection. Or, a designer may decide to only approximate the spectral shape described in Equation (2) or (6), to realize a favorable trade-off between system cost and performance. Or, when realizing the ISE as a thin-film coating, a designer may decide that an internal field stop or other location in the system may be a better position for the ISE.

I claim:

1. A method for improving the long-term stability of spectroscopic quantitative analyses performed on a population of samples, comprising the steps of:
   A) measuring a sample spectrum of one of said samples and a reference spectrum, by using measurement light and a spectroscopic instrument;
   B) computing an absorbance spectrum from said sample spectrum and said reference spectrum;
   C) inserting an inverse sample element into the path of said measurement light during either the measurement of said sample spectrum or the measurement of said reference spectrum, removing said inverse sample element out of said path of said measurement light during one of said measurements of said sample spectrum and said reference spectrum, the spectral response of said inverse sample element being determined from the spectral response of the average of said population of samples so that wavelength axis instabilities of said spectroscopic instrument cause opposite and nearly cancelled amplitude effects in a relevant wavelength range of said absorbance spectrum; and
   D) applying a computer algorithm to said absorbance spectrum to estimate the value of a property of interest; whereby the long-term accuracy of said quantitative analyses is improved and the need for calibration maintenance is reduced.

2. The method of claim 1 wherein said step C is comprised of:
   i) designing said inverse sample element to have a spectral response essentially proportional to the inverse of the product of the spectral responses from said spectroscopic instrument and said average of said population in said relevant wavelength range; and
   ii) inserting said inverse sample element into said path of said measurement light during said measurement of said sample spectrum.

3. The method of claim 1 wherein said step C is comprised of:
   i) designing said inverse sample element to have a spectral response essentially proportional to the spectral response from said average of said population in said relevant wavelength range; and
   ii) inserting said inverse sample element into said path of said measurement light during said measurement of said reference spectrum.

4. The method of claim 1 wherein during said measurement of said reference spectrum an additional reference element is inserted into said path of said measurement light.

5. The method of claim 4 wherein said reference element is a diffuse reflection material.

6. The method of claim 4 wherein said inverse sample element and said reference element are integrated into a single unit.

7. A method for improving the long-term stability of spectroscopic quantitative analyses performed on a population of samples, comprising the steps of:
   A) measuring a sample spectrum of one of said samples and a reference spectrum, by using measurement light and a spectroscopic instrument;
   B) applying a noise-filtering algorithm to said reference spectrum to obtain a filtered reference spectrum, wherein said noise-filtering algorithm is a smoothing algorithm;

C) computing an absorbance spectrum from said sample spectrum and said filtered reference spectrum; and D) applying a computer algorithm to said absorbance spectrum to estimate the value of a property of interest; whereby amplitude effects caused by wavelength axis instabilities in said reference spectrum are prevented from propagating into said absorbance spectrum.

8. The method of claim 7, further including the step of:

positioning an inverse sample element in the path of said measurement light during both the measurement of said sample spectrum and the measurement of said reference spectrum, the optical response of said inverse sample element being essentially proportional to the inverse of the product of the spectral responses from said spectroscopic instrument and the average of said population of samples in a relevant wavelength range; whereby the long-term stability of said quantitative analyses is improved and the need for calibration maintenance is reduced without mechanical movement of said inverse sample element.

9. The method of claim 7 wherein said noise-filtering algorithm is based on an eigenfactor decomposition of a representative population of reference spectra.

10. The method of claim 9 wherein said noise-filtering algorithm projects said reference spectrum into a spectral subspace spanned by a reduced subset of eigenfactors of said eigenfactor decomposition.

11. The method of claim 7 wherein said noise-filtering algorithm is based on a low-pass filter algorithm.

12. The method of claim 7 wherein during the measurement of said reference spectrum an additional reference element is inserted into the path of said measurement light.

13. The method of claim 12 wherein said reference element is a diffuse reflection material.

14. An optical element for improving the long-term stability of spectroscopic quantitative analyses performed on a population of samples, comprising:

A) means for positioning said optical element into the path of the measurement light of a spectroscopic instrument; and B) means for shaping the spectral response of said optical element to be essentially proportional in a relevant wavelength range to a response spectrum selected from the group consisting of the spectral response of the average of said population of samples and the inverse of the product of the spectral responses from said spectroscopic instrument and said average of said population of samples.

15. The optical element of claim 14 wherein said means for shaping said spectral response of said optical element are comprised of at least one filter glass.

16. The optical element of claim 14 wherein said means for shaping said spectral response of said optical element are comprised of a thin-film structure.

17. The optical element of claim 16 wherein said thin-film structure is attached to an optical surface of a sample cuvette.

18. The optical element of claim 16 wherein said thin-film structure is attached to an optical surface of an element mounted permanently inside said spectroscopic instrument.

19. The optical element of claim 16 wherein said thin-film structure is made from a single metallic layer of varying thickness.

* * * * *